US010161541B2

(12) United States Patent
Takada et al.

(10) Patent No.: US 10,161,541 B2
(45) Date of Patent: Dec. 25, 2018

(54) THROTTLE DEVICE AND REFRIGERATION CYCLE SYSTEM WITH SAME

(71) Applicant: SAGINOMIYA SEISAKUSHO, INC., Nakano-ku, Tokyo (JP)

(72) Inventors: Yasumasa Takada, Sayama (JP); Yuichiro Toyama, Sayama (JP); Shinpei Yagi, Sayama (JP); Junichi Yokota, Sayama (JP)

(73) Assignee: SAGINOMIYA SEISAKUSHO, INC., Nakano-Ku, Tokyo (JP)

( * ) Notice: Subject to any disclaimer, the term of this patent is extended or adjusted under 35 U.S.C. 154(b) by 0 days.

(21) Appl. No.: 15/551,836

(22) PCT Filed: Jan. 7, 2016

(86) PCT No.: PCT/JP2016/000062
§ 371 (c)(1),
(2) Date: Aug. 17, 2017

(87) PCT Pub. No.: WO2016/136120
PCT Pub. Date: Sep. 1, 2016

(65) Prior Publication Data
US 2018/0038511 A1    Feb. 8, 2018

(30) Foreign Application Priority Data
Feb. 27, 2015    (JP) .................. 2015-038843

(51) Int. Cl.
*F16K 47/02*    (2006.01)
*F25B 1/00*    (2006.01)
(Continued)

(52) U.S. Cl.
CPC .............. *F16K 47/02* (2013.01); *F16K 17/30* (2013.01); *F25B 1/00* (2013.01); *F25B 41/06* (2013.01); *F25B 41/062* (2013.01)

(58) Field of Classification Search
CPC .......... F16K 47/02; F16K 17/30; F25B 41/06; F25B 1/00
See application file for complete search history.

(56) References Cited

U.S. PATENT DOCUMENTS

| | | | | |
|---|---|---|---|---|
| 3,372,902 A | * | 3/1968 | Gotzenberger | ........... F16K 1/38 |
| | | | | 251/149.6 |
| 4,365,746 A | * | 12/1982 | Tanasawa | ............ F02M 61/163 |
| | | | | 239/125 |
| 5,901,750 A | * | 5/1999 | Kozinski | ................. F16K 17/30 |
| | | | | 137/504 |

FOREIGN PATENT DOCUMENTS

| | | |
|---|---|---|
| JP | S55-40295 U1 | 3/1980 |
| JP | S59-90671 U1 | 6/1984 |
| | (Continued) | |

OTHER PUBLICATIONS

International Search Report dated Mar. 29, 2016, issued in PCT Application No. PCT/JP2016/000062, filed Jan. 7, 2016.
(Continued)

*Primary Examiner* — Larry Furdge
(74) *Attorney, Agent, or Firm* — Workman Nydegger

(57) ABSTRACT

In a throttle device, a body portion has a flat surface at a position at a predetermined distance from its center axis. Thus, when a needle member is moving, a working pressure of a refrigerant present between an inner peripheral surface of a guide tube and the flat surface acts in a radial direction of the body portion and presses part of an outer peripheral surface of the body portion located opposite from the flat surface against the inner peripheral surface of the guide tube.

13 Claims, 13 Drawing Sheets

(51) Int. Cl.
*F25B 41/06* (2006.01)
*F16K 17/30* (2006.01)

(56) References Cited

FOREIGN PATENT DOCUMENTS

| JP | S61-202765 U1 | 12/1986 |
| JP | 2001-263866 A | 9/2001 |
| JP | 3528433 B | 3/2004 |
| JP | 4041406 B | 11/2007 |

OTHER PUBLICATIONS

International Preliminary Report on Patentability dated Sep. 8, 2017, issued in PCT Application No. PCT/JP2016/000062, filed Jan. 7, 2016.

* cited by examiner

THROTTLE DEVICE AND REFRIGERATION CYCLE SYSTEM WITH SAME

TECHNICAL FIELD

The present invention relates to a throttle device and a refrigeration cycle system with same.

BACKGROUND ART

There has been proposed a refrigeration cycle system for air-conditioning apparatuses, which is provided with a differential pressure-type throttle device instead of a capillary tube serving as the throttle device. The differential pressure-type throttle device is configured to optimally control a pressure of a refrigerant between an outlet of a condenser and an inlet of an evaporator in order to efficiently operate a compressor in accordance with an outside air temperature. Moreover, in a refrigeration cycle system that is capable of changing the number of revolutions of the compressor, the differential pressure-type throttle device is also configured to optimally control the pressure of the refrigerant in accordance with the number of revolutions of the compressor from the viewpoint of power saving. For example, one end of the throttle device through which the refrigerant is injected is joined to a primary duct connected to the condenser, and another end thereof from which the refrigerant is discharged is joined to a secondary duct connected to the evaporator.

As shown in PATENT DOCUMENT 1, for example, such a differential pressure-type throttle device includes: a valve body which adjusts an opening degree of a valve port of a housing; a guide skirt which has a plurality of holes and guides a movement of the valve body; and a coil spring which biases the valve body toward a space at an inlet port of the housing. In the above-described differential pressure-type throttle device, so-called hunting may occur which is a phenomenon where the valve body repeats a series of actions of instantaneously moving in a closing direction due to a reduction in a pressure on the primary duct side inside the housing, upon moving in a direction to increase the opening degree of the valve port of the housing.

In order to prevent the hunting, as shown in PATENT DOCUMENT 2, for example, there has been proposed a differential pressure-type throttle device having a wing (which is called an anti-vibration spring (see FIG. 4 and FIG. 5) in PATENT DOCUMENT 2) provided with a plurality of elastic sliding contact pieces. The wing made of a metal is provided in a spring chamber in a state of being pressed by use of a spring against a spring receiving portion of the valve body provided at the inlet port of a main body. Thus, when the valve body is moved, the a plurality of elastic sliding contact pieces of the wing move in sliding contact with an inner wall surface of the spring chamber, thereby suppressing an abrupt movement of the valve body. Therefore, the hunting is prevented.

PRIOR ART DOCUMENTS

Patent Documents

Patent Document 1: Japanese Patent No. 3528433
Patent Document 2: Japanese Patent No. 4041406

SUMMARY OF INVENTION

The elastic sliding contact pieces of the wing as shown in PATENT DOCUMENT 2 is in danger of a deformation because they repeatedly move in sliding contact with the inner wall surface of the spring chamber in response to a working pressure of the refrigerant. The durability thereof becomes a problem.

In view of the above-described problem, the present invention aims to provide a throttle device and a refrigeration cycle system with the same. The throttle device and a refrigeration cycle system with the same can prevent hunting without being provided with a wing.

To achieve the above-described object, a throttle device according to the present invention includes: a tube body provided in a duct to supply a refrigerant, and including open end portions located at two ends to communicate with insides of the duct; a valve seat provided in the tube body, and having a valve port; a needle member provided to be capable of coming close to and moving away from the valve port of the valve seat, and having a tapered portion to control an opening area of the valve port; a biasing member provided between the needle member and one of the open end portions of the tube body, and configured to bias the needle member in a direction to come close to the valve port of the valve seat; and braking means for inducing a pressure of the refrigerant such that an outer peripheral surface of a body portion of the needle member is pressed against an inner peripheral surface of the tube body in a radial direction from a central axis of the needle member when the refrigerant passes through the valve port.

Moreover, the throttle device may further include a stopper member provided between the needle member and the other open end portion of the tube body and configured, in a case where a force applied to the needle member by the pressure of the refrigerant does not exceed a biasing force of the biasing member, to be in contact with and support a front end portion of the tapered portion of the needle member biased by the basing member such that a clearance is formed between the tapered portion of the needle member and a periphery of the valve port.

The braking means may be a clearance formed by a flat surface formed at a position away from the center axis in the body portion of the needle member, and an inner peripheral surface of the tube body opposed to the flat surface.

Moreover, another throttle device according to the present invention includes: a guide tube provided in a duct to supply a refrigerant, and having open end portions located at two ends to communicate with insides of the ducts; a valve seat formed in the guide tube, and having a valve port; at least one communication path formed in a portion of the guide tube adjacent to the valve seat, and configured to establish communication between an inner peripheral part and an outer peripheral part of the guide tube; a needle member provided to be capable of coming close to and moving away from the valve port of the valve seat, and having a tapered portion to control an opening area of the valve port; a biasing member provided between the needle member and one of the open end portions of the guide tube, and configured to bias the needle member in a direction to come close to the valve port of the valve seat; and braking means for inducing a pressure of the refrigerant such that an outer peripheral surface of a body portion of the needle member is pressed against an inner peripheral surface of the guide tube in a radial direction from a central axis of the needle member when the refrigerant passes through the valve port.

Furthermore, the throttle device may further include a stopper member provided between the needle member and the other open end portion of the guide tube and configured, in a case where a force applied to the needle member by the pressure of the refrigerant does not exceed a biasing force of the biasing member, to be in contact with and support a front end portion of the tapered portion of the needle member biased by the basing member such that a clearance is formed between the tapered portion of the needle member and a periphery of the valve port. In addition, the braking means may be a clearance formed by a flat surface formed at a position away from the center axis in the body portion of the needle member, and an inner peripheral surface of the guide tube opposed to the flat surface. The braking means may be a clearance formed by the tapered portion of the needle member, and a groove formed in a periphery of the valve port. The braking means may be a clearance formed by a flat surface formed at the tapered portion of the needle member, and a periphery of the valve port opposed to the flat surface. The braking means may be a groove penetrating the tapered portion of the needle member along a radial direction of the tapered portion. The braking means may be a slant surface portion formed at a front end of the needle member.

The throttle device according to the present invention may further include a biasing member support portion configured to support the biasing member. Here, when the needle member is moved toward a spring guide portion of the biasing member support portion by a predetermined value or more, a front end of the spring guide portion may come into contact with a front end of the needle member opposed to the front end of the spring guide portion.

A refrigeration cycle system according to the present invention comprises: an evaporator; a compressor; and a condenser, wherein the above-described throttle device is provided in a duct located between an outlet of the condenser and an inlet of the evaporator.

According to the throttle device and the refrigeration cycle system with the same according to the present invention, the braking means induces the pressure of the refrigerant such that the outer peripheral surface of the body portion of the needle member is pressed against the inner peripheral surface of the tube body in the radial direction from the central axis of the needle member when the refrigerant passes through the valve port. Hereby, sliding resistance is generated between the outer peripheral surface of the body portion of the needle member and the inner peripheral surface of the tube body. Thus, it is possible to prevent hunting without providing a wing.

DESCRIPTION OF EMBODIMENTS

Figure 3:
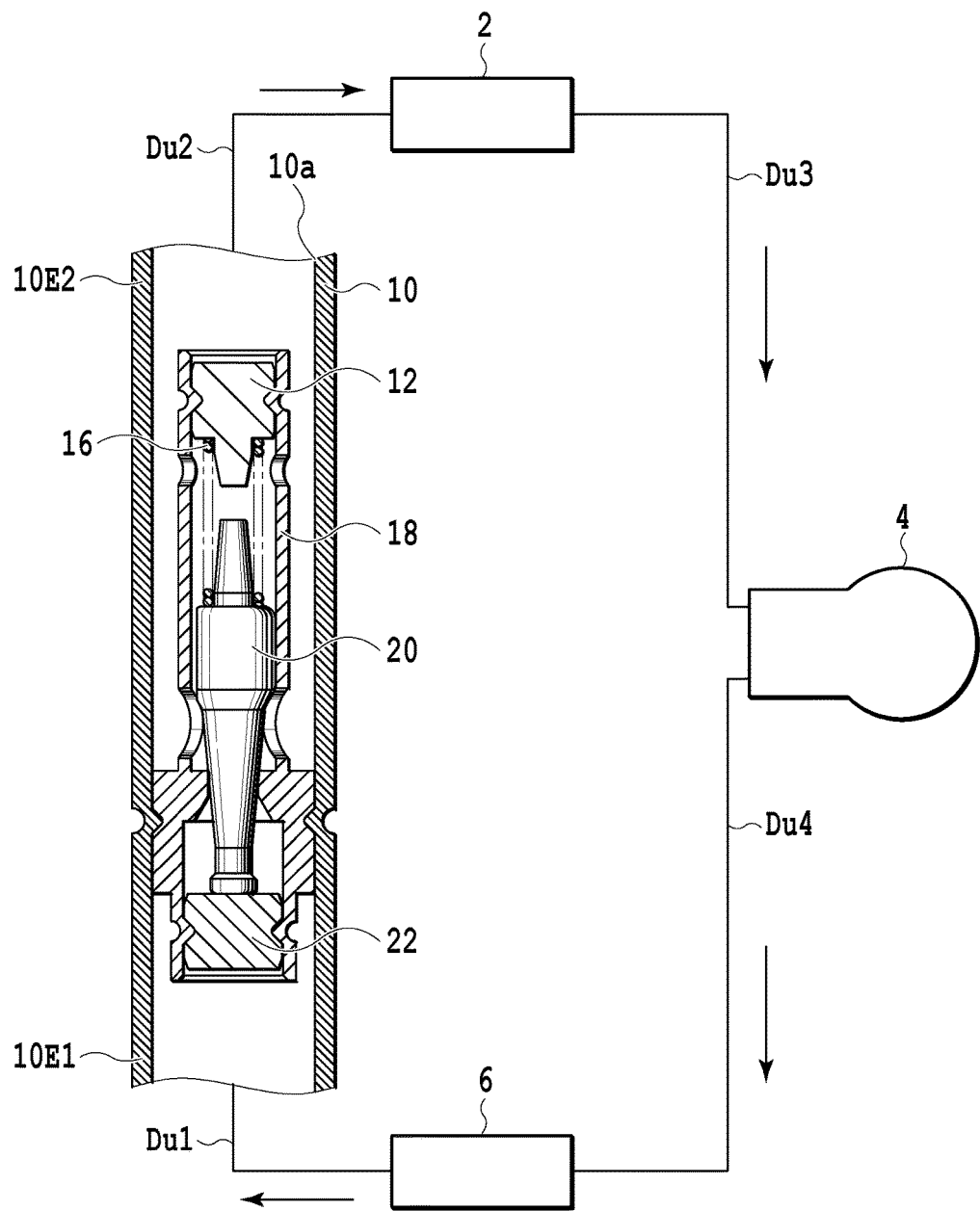
FIG. 3 is a diagram schematically showing a configuration of a refrigeration cycle system applying each embodiment of the throttle device according to the present invention.

FIG. 3 shows a configuration of a first embodiment of a throttle device according to the present invention, which is applied to an example of a refrigeration cycle system.

As shown in FIG. 3, for example, the throttle device is disposed between an outlet of a condenser 6 and an inlet of an evaporator 2 among ducts of the refrigeration cycle system. In the throttle device, one end 10E1 of a tube body 10 to be described later is joined to a primary duct Du1 and another end 10E2 of the tube body 10 from which a refrigerant is discharged is joined to a secondary duct Du2. The primary duct Du1 is designed to connect the outlet of the evaporator 6 to the throttle device, and the secondary duct Du2 is designed to the inlet of the evaporator 2 to the throttle device. As shown in FIG. 3, a compressor 4 is connected between an outlet of the evaporator 2 and an inlet of the condenser 6 by using a duct Du3 joined to the outlet of the evaporator 2 and a duct Du4 joined to the inlet of the condenser 6. The compressor 4 is driven by control of a not-illustrated control unit. Thereby, the refrigerant in the refrigeration cycle system is circulated along arrows indicated in FIG. 3, for example.

Figure 1A:
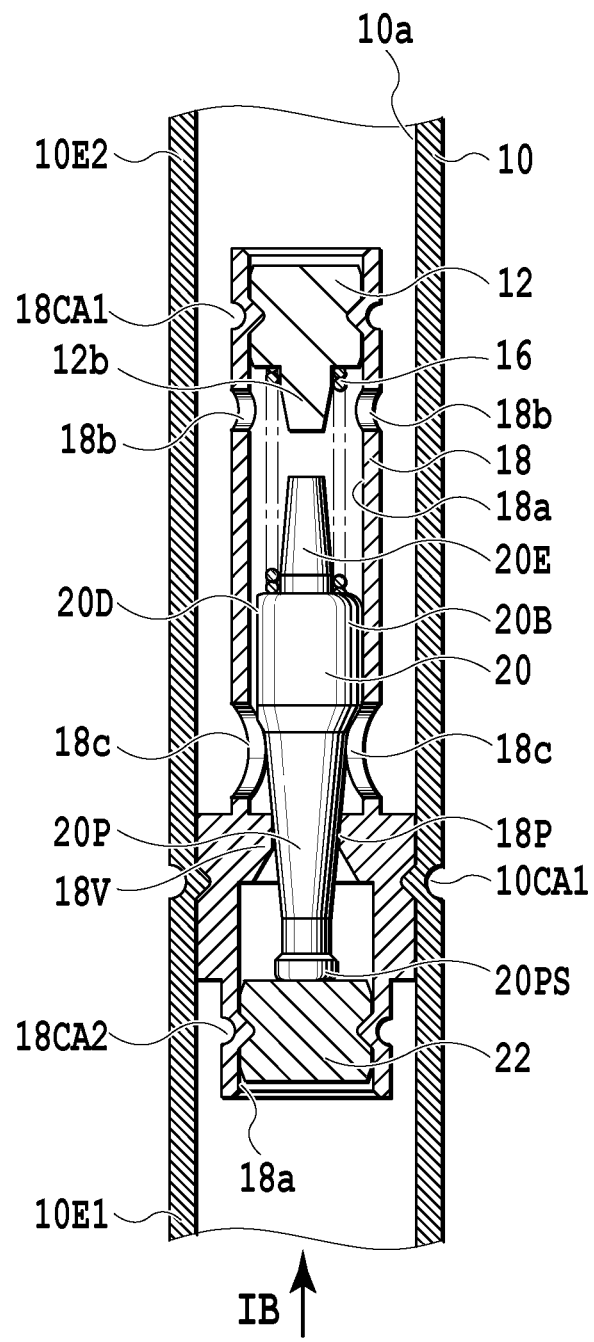
FIG. 1A is a cross-sectional view showing a configuration of a first embodiment of a throttle device according to the present invention.

As shown in the enlarged view of FIG. 1A, the throttle device comprises, as its main elements: the tube body 10 joined to the ducts of the above-described refrigeration cycle system; a guide tube 18 fixed to an inner peripheral part of the tube body 10; a valve seat 18V formed integrally with an end portion of the guide tube 18 located close to the primary duct Du1 and constituting a refrigerant flow rate adjustment unit that adjusts a flow rate of the refrigerant; a needle member 20; a coil spring 16 which biases the needle member 20 in a direction to come close to the valve seat 18V; a spring receiving portion 12 which supports one end portion of the coil spring 16; and a stopper member 22 which receives a large diameter portion 20PS of the needle member 20 to be described later.

The tube body 10 having a predetermined length and a predetermined diameter is made of any of a copper pipe, a stainless steel pipe, and an aluminum pipe, for example. The one end 10E1 of the tube body 10 through which the refrigerant is injected is joined to the primary duct Du1 connected to the condenser 6, and the other end 10E2 thereof from which the refrigerant is discharged is joined to the secondary duct Du2 connected to the evaporator 2.

An outer peripheral part of the guide tube 18 is fixed to an intermediate portion located at a predetermined distance away from the one end 10E1 of the inner peripheral part of the tube body 10. A projection formed in conjunction with a cavity 10CA1 of the tube body 10 provided by caulking bites into and thus fixes the outer peripheral part of the guide tube 18.

The guide tube 18 is made of any of a copper pipe, a brass pipe, an aluminum pipe, and a stainless steel pipe, for example. The guide tube 18 has: the spring receiving portion 12 located at an end portion close to the other end 10E2 of the tube body 10; and the stopper member 22 provided at an inner peripheral part which is located at an end portion close to the one end 10E1 of the tube body 10. A projection formed in conjunction with a cavity 18CA1 of the guide tube 18 provided by caulking bites into and thus fixes the spring receiving portion 12. The spring receiving portion 12 serving as a biasing member support portion has a spring guide 12b which is engaged with the one end of the coil spring 16.

Figure 1B:
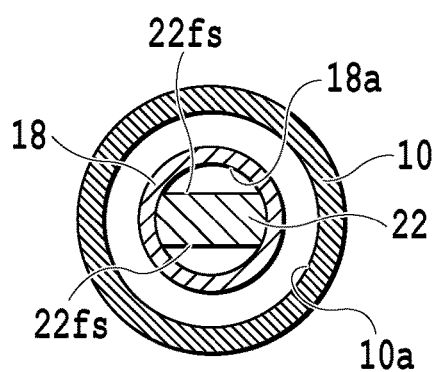
FIG. 1B is a view of the example shown in FIG. 1A, which is viewed in the direction of an arrow A.

Moreover, a projection formed in conjunction with a cavity 18CA2 of the guide tube 18 provided by caulking bites into an outer peripheral part of the stopper member 22 and thus the stopper member 22 is fixed on the inner peripheral part 18a thereof. As shown in the enlarged view of FIG. 1B, the stopper member 22 has a substantially rectangular cross section and is made of a metal material, for example. The stopper member 22 has a pair of flat surfaces 22fs opposed to each other along a flow of the refrigerant. Hereby, flow paths each having a substantially half-moon-shaped cross section are formed opposite to each other between the respective flat surfaces 22fs of the stopper member 22 and the inner peripheral part 18a of the guide tube 18. Two end surfaces of the stopper member 22 formed orthogonal to the flow of the refrigerant also have substantially flat surfaces. The large diameter portion 20PS of the needle member 20 to be described later is brought into contact with one of the two end surfaces of the stopper member 22.

As shown in FIG. 1A, first communication holes 18b and second communication holes 18c to bring the inner peripheral part of the guide tube 18 into communication with a space between the inner peripheral part of the tube body 10 and the outer peripheral part of the guide tube 18 are formed between the spring receiving portion 12 and the stopper member 22. A diameter of each second communication hole 18c is set larger than a diameter of each first communication hole 18b.

The valve seat 18V formed between the stopper member 22 and the second communication holes 18c in the guide tube 18 has a valve port 18P which is located at an inner central part and into which a tapered portion 20P of the needle member 20 to be described later is inserted. The valve port 18P has a predetermined diameter, and is formed to diverge toward the one end 10E1 along the center axis of the valve seat 18V.

The needle member 20 is made of brass or stainless steel, for example. The needle member 20 comprises: a body portion 20B having a columnar shape; the tapered portion 20P formed at an end portion of the body portion 20B opposed to the valve seat 18V; and a spring guide portion 20E having a shape of a projection formed at an end portion of the body portion 20B opposed to another end portion of the coil spring 16.

Figure 2A:
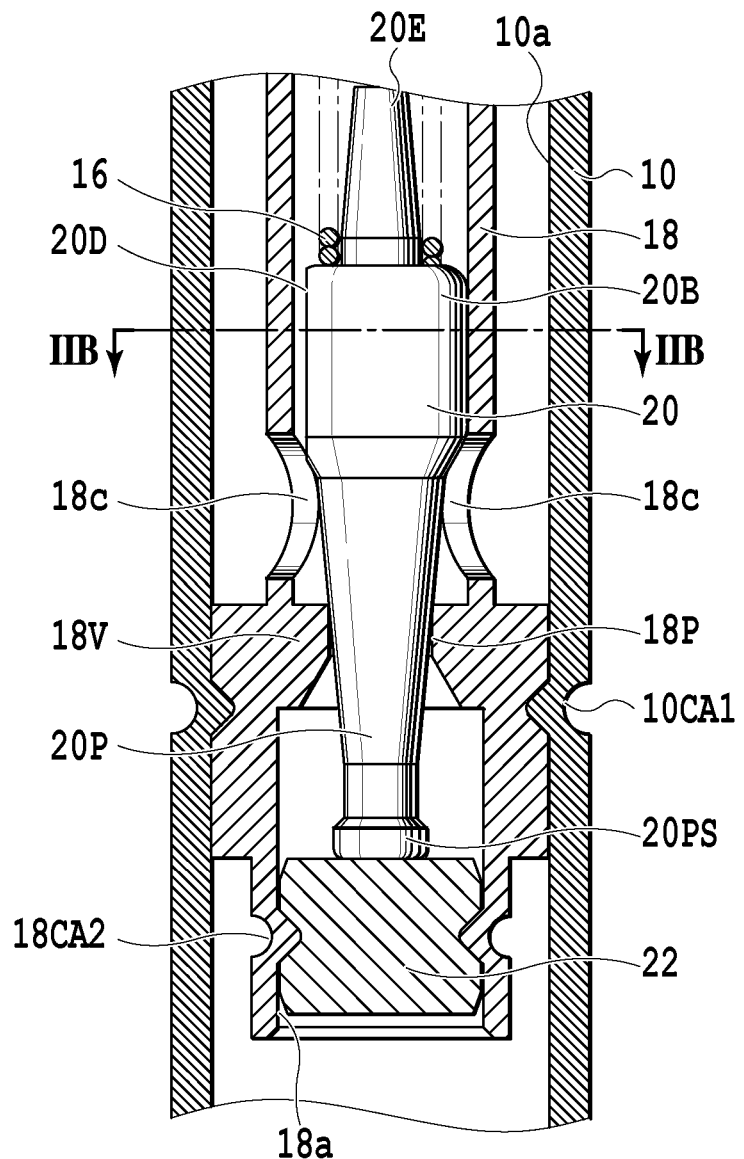
FIG. 2A is a partial enlarged cross-sectional view showing a part of the example shown in FIG. 1A.
Figure 2B:
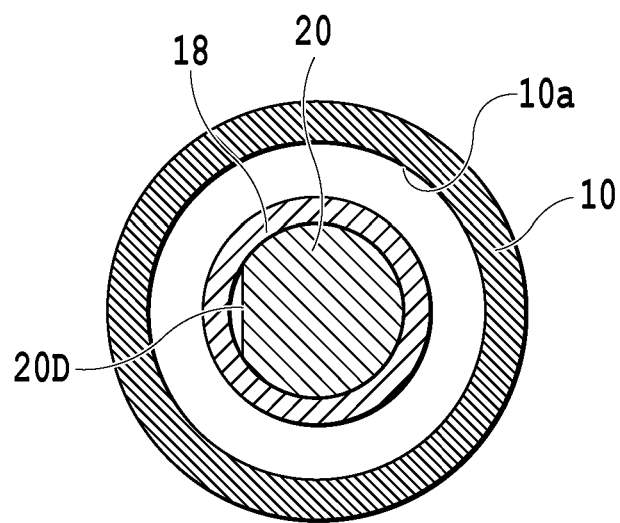
FIG. 2B is a cross-sectional view taken along IIB-IIB line in the partial cross-sectional view shown in FIG. 2A.

As shown in FIG. 2B, the body portion 20B has a flat surface 20D at a position a predetermined distance away from its center axis. The flat surface 20D is formed from one end to another end of the body portion 20B along the central axis thereof. Hereby, while the needle member 20 is moving, a working pressure of the refrigerant present between the inner peripheral surface 18a of the guide tube 18 and the flat surface 20D acts in a radial direction of the body portion 20B and presses part of an outer peripheral surface of the body portion 20B located opposite from the flat surface 20D against the inner peripheral surface 18a of the guide tube 18. In other words, a clearance formed between the inner peripheral surface 18a of the guide tube 18 and the flat surface 20D constitutes braking means for inducing the pressure of the refrigerant such that the above-mentioned part of the outer peripheral surface is pressed against the inner peripheral surface 18a of the guide tube 18. Accordingly, sliding resistance is formed between the outer peripheral surface of the body portion 20B and the inner peripheral surface 18a of the guide tube 18. Moreover, a contact area between the outer peripheral surface of the body portion 20B and the inner peripheral surface 18a is increased without tilting an attitude of the needle member 20. Therefore, this is advantageous in terms of wear of the body portion 20B.

A junction between the body portion 20B and the tapered portion 20P is opposed to the second communication holes 18c. The other end portion of the coil spring 16 is engaged with the spring guide portion 20E of the needle member 20. Moreover, the spring guide portion 12b is engaged with the one end portion of the coil spring 16. A front end of the spring guide portion 20E and a front end of the spring guide portion 12b are located away from each other by a predetermined distance. Hereby, if the needle member 20 is moved toward the spring guide portion 12b by a predetermined value or more, the front end of the spring guide portion 20E comes into contact with the front end of the spring guide portion 12b. Thus, the movement of the needle member 20 is restricted. As a consequence, the coil spring 16 is prevented from being excessively compressed to a predetermined value or above.

As shown in the enlarged view of FIG. 2A, the tapered portion 20P having a truncated conical shape with a predetermined taper angle has a base portion, which has a larger diameter than the diameter of the valve port 18P, and is located at a position away from the valve port 18P. A taper with its outside diameter gradually reduced toward a front end of the tapered portion 20P is provided at a boundary portion between the body portion 20B and the base portion of the tapered portion 20P. This taper is opposed to the second communication holes 18c as described previously, and is chamfered so that a fluid passing through a throttle portion to be described later can easily flow into the second communication holes 18c. A columnar portion having a constant diameter by a predetermined length is formed at an end portion of the tapered portion 20P having the smallest diameter. A length from a position of the tapered portion 20P corresponding to an open end portion of the valve port 18P to the above-mentioned columnar portion thereof is set to a predetermined length. This makes it possible to increase a valve opening degree according to a differential pressure (a difference between an inlet pressure of the refrigerant on the one end 10E1 side and an outlet pressure of the refrigerant on the other end 10E2 side). Moreover, since turbulence of the fluid is small, a level of a generated sound pressure is suppressed at the time of passage of the refrigerant.

At an extreme tip portion of the tapered portion 20P extending toward the stopper member 22, there is formed the large diameter portion 20PS which has a diameter larger than a diameter in the vicinity of the columnar portion and slightly smaller than the diameter of the valve port 18P. A thickness of the large diameter portion 20PS is set to a predetermined value.

At a position where an outer peripheral part of the tapered portion 20P of the needle member 20 corresponds to the open end portion of the valve port 18P, the outer peripheral part of the tapered portion 20P is disposed to form a predetermined clearance with the periphery of the open end portion of the valve port 18P. The large diameter portion 20PS is brought into contact with the flat surface of the stopper member 22 at a predetermined pressure that corresponds to a difference between a biasing force of the coil spring 16 and the pressure of the refrigerant from the primary duct Du1. When the outer peripheral part of the tapered portion 20P of the needle member 20 is located away from the periphery of the open end portion of the valve port 18P as described above, a throttle portion is formed between the tapered portion 20P of the needle member 20 and the open end portion of the valve port 18P. The throttle portion is defined as a location (the narrowest portion) where an intersection point of a perpendicular line extending from the periphery of the valve port 18P to a generatrix of the tapered portion 20P with the generatrix of the tapered portion 20P is closest from an edge of the valve port 18P. An area of a conical surface drawn with this perpendicular line is equivalent to an opening area of the throttle portion.

Thereby, a predetermined bleed amount passing through the throttle portion is set. Moreover, since the large diameter portion 20PS of the tapered portion 20P of the needle member 20 is brought into contact with the flat surface of the stopper member 22, the tapered portion 20P of the needle member 20 is prevented from biting at the open end of the valve port 18P of the valve seat 18V due to an undesired pressure acting on the needle member 20.

Moreover, a separation start timing at which the outer peripheral part of the tapered portion 20P of the needle member 20 starts moving further away from the periphery of the open end portion of the valve port 18P due to the differential pressure (the difference between the inlet pressure of the refrigerant on the one end 10E1 side and the outlet pressure of the refrigerant on the other end 10E2 side) is set on the basis of the biasing force of the coil spring 16. A spring constant of the coil spring 16 is set to a predetermined value.

A contact area of the large diameter portion 20PS of the needle member 20 with the flat surface of the stopper member 22 is set larger than a cross-sectional area of the end portion of the tapered portion 20P so as to reduce a surface pressure. Accordingly, the wear of the large diameter portion 20PS of the needle member 20 is suppressed, and a secular change of the bleed flow rate is less likely to occur.

In addition, when the large diameter portion 20PS comes into contact with the stopper member 22, the biasing force of the coil spring 16 in a direction to close the valve acts on a plane of contact between the stopper member 22 and the large diameter portion 20PS. At that time, another force in a direction to open the valve also acts on the tapered portion 20P due to a difference in pressure between the pressure of the refrigerant from the primary duct Du1 and the pressure of the refrigerant from the secondary duct Du2. Thereby, the wear of the large diameter portion 20PS of the needle member 20 is suppressed. This is another factor that makes the secular change of the bleed flow rate less likely to occur.

An adjustment of the biasing force of the coil spring 16, namely, an adjustment of a reference height (a set length) of the coil spring 16 corresponding to each refrigerant is conducted in accordance with the following procedures, for example. The reference height is defined as a height of the coil spring 16 which is set such that the tapered portion 20P of the needle member 20 starts moving further away from the periphery of the open end portion of the valve port 18P at the predetermined separation start timing described above so as to correspond to each refrigerant.

To begin with, when the stopper member 22 is fixed to the guide tube 18, the needle member 20 is first inserted into the inner peripheral part of the guide tube 18. Thereafter, the needle member 20 is pressed against the valve seat 18V by using the coil spring and the like. Thereafter, the guide tube 18 into which the stopper member 22 is inserted is provided in a bleed flow rate measurement device/caulking device (not shown) that treats air as the fluid, for example. In this state, a position of the stopper member 22 relative to the guide tube 18 is adjusted such that the flow rate of the air becomes equal to a target bleed flow rate. Thereafter, the stopper member 22 is fixed by caulking to the guide tube 18. Thus, the adjustment of the bleed flow rate is completed.

And then, when the spring receiving portion 12 is fixed, the guide tube 18 to which the stopper member 22 is fixed is provided in a given performance measurement/caulking device (not shown) that treats the air as the fluid, for example. In this state, after a position of the spring receiving portion 12 relative to the guide tube 18 is adjusted based on detection of an air flow rate in a state of applying a prescribed pressure, the spring receiving portion 12 is fixed by caulking. Hereby, an adjustment of a spring length of the coil spring 16 is completed.

Accordingly, an adjustment screw or the like for adjusting the spring length of the coil spring 16 is not required. Thus, it is possible to adjust the pressure at the start of opening the valve corresponding to each refrigerant, and moreover, to simplify the structure of the throttle device and to reduce a manufacturing cost thereof.

In this configuration, in the case where the force applied to the needle member 20 by the pressure of the refrigerant does not exceed the biasing force of the coil spring 16 as shown in FIG. 3, while the refrigerant is supplied through the primary duct Du1 and along the direction indicated with the arrows therein, the pressure of the refrigerant is reduced because the refrigerant passes through the one end 10E1 of the tube body 10, the clearances between the respective flat surfaces 22fs of the stopper member 22 and the inner peripheral part 18a of the guide tube 18, and the above-mentioned throttle portion. Thereafter, the refrigerant at the predetermined bleed amount is discharged from the other end 10E2 through the second communication holes 18c as well as a clearance between the outer peripheral part of the guide tube 18 and an inner peripheral part 10a of the tube body 10.

Figure 4:
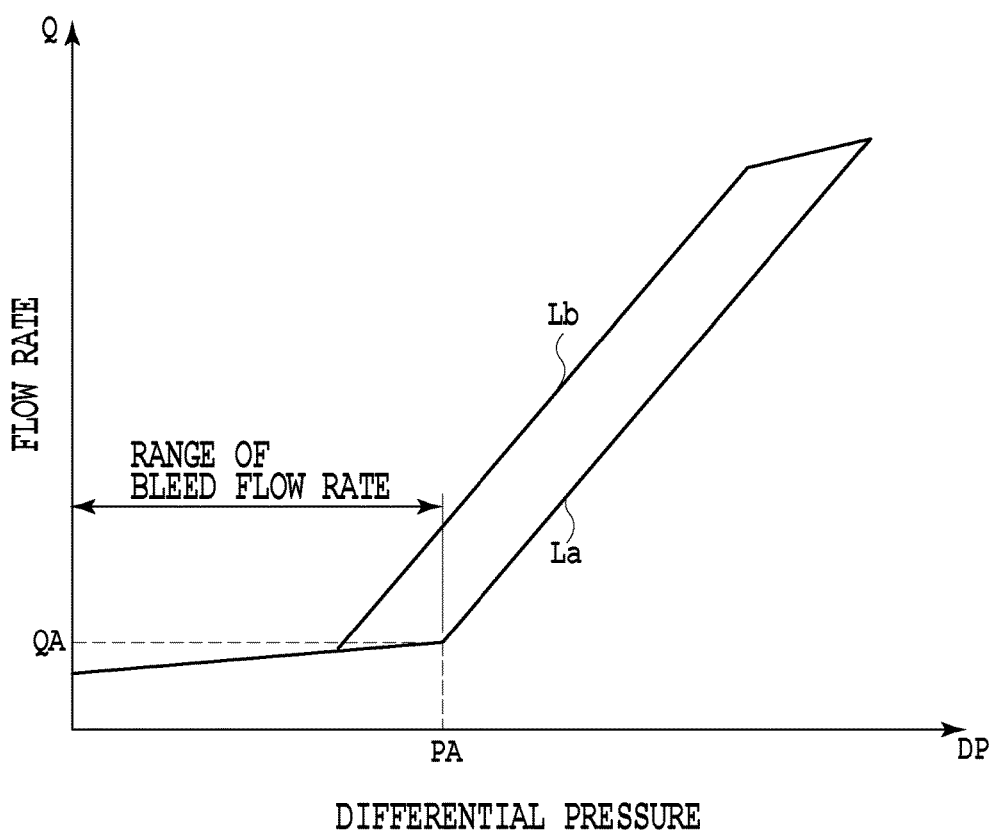
FIG. 4 is a characteristic diagram showing changes in flow rate corresponding to a differential pressure, which is made available for explaining an operation of the first embodiment of the throttle device according to the present invention.

Furthermore, in the case where the force applied to the needle member 20 by the pressure of the refrigerant exceeds the biasing force of the coil spring 16, the refrigerant that flows through the above-mentioned throttle portion presses the needle member 20 in a direction to move the needle member 20 further away from the periphery of the valve port 18P. Hereby, as shown in FIG. 4, a flow rate Q of the refrigerant is gradually increased in accordance with a characteristic line La more than the bleed amount along with an increase in differential pressure DP. When the above-mentioned differential pressure DP has a predetermined value PA (a value in a range from 0.2 MPa to 0.9 MPa inclusive) and the flow rate Q is equal to or above a predetermined value QA (several liters per minute), for example, the flow rate is sharply increased along a characteristic line La with the increase in differential pressure DP. Moreover, after the needle member 20 is moved away from the valve port 18P, the pressure on the primary side is reduced and the needle member 20 is moved in a direction to come close to the valve port 18P due to a pressing force originated from a difference between the biasing force of the coil spring 16 and the sliding resistance to be described later.

At that time, sliding resistance is generated as a consequence of the fact that the working pressure of the refrigerant present between the inner peripheral surface 18a of the guide tube 18 and the flat surface 20D of the needle member 20, which acts in the radial direction of the body portion 20B and presses part of the outer peripheral surface of the body portion 20B located opposite from the flat surface 20D against the inner peripheral surface 18a of the guide tube 18. Hence, after the flow rate Q is gradually reduced in response to the reduction in differential pressure, the flow rate Q is then reduced in accordance with a characteristic line Lb, which defines a pathway substantially parallel to the characteristic line La but different from the characteristic line La. Hereby, when the differential pressure DP reverts to the predetermined value PA, the flow rate reaches a value equal to or above the predetermined value QA. Moreover, when the differential pressure DP falls under the predetermined value PA, the flow rate reaches the predetermined value QA in retard. Accordingly, a change in flow rate exhibits a change with so-called hysteresis, and occurrence of hunting is thus suppressed.

Note that FIG. 4 shows the characteristic lines La and Lb representing the changes in flow rate corresponding to the differential pressure of the refrigerant, in which the vertical axis indicates the flow rate Q of the refrigerant passing through the above-described throttle portion and the horizontal axis indicates the differential pressure DP of the refrigerant mentioned above.

Figure 5A:
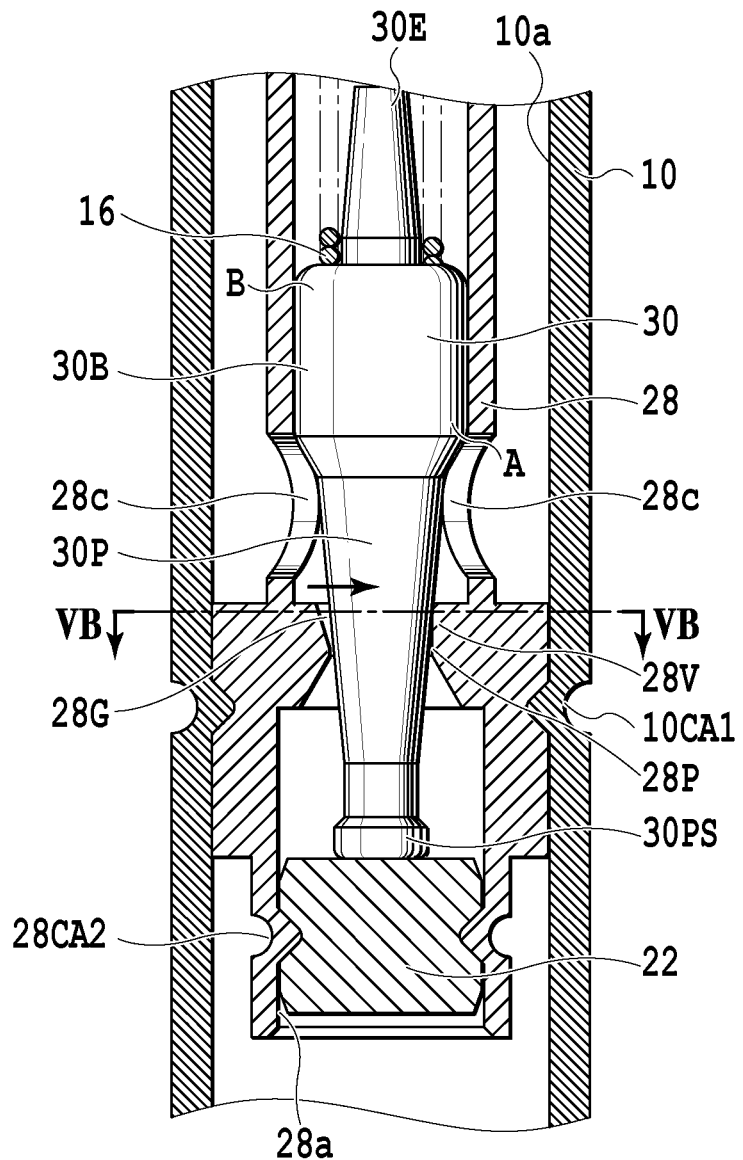
FIG. 5A is a partial enlarged cross-sectional view showing a part of a configuration of a second embodiment of a throttle device according to the present invention.

FIG. 5A shows a main part of a configuration of a second embodiment of a throttle device according to the present invention. Note that constituents in FIG. 5A which are the same as those in the example shown in FIG. 1A are denoted with the same reference signs and duplicate explanation thereof will be omitted.

In FIG. 5A, the throttle device is disposed between the outlet of the condenser 6 and the inlet of the evaporator 2 among the ducts of the refrigeration cycle system as shown in FIG. 3, for example. Moreover, in the throttle device, the one end 10E1 of the tube body 10 to be described later is joined to the primary duct Du1 and the other end 10E2 of the tube body 10 from which the refrigerant is discharged is joined to the secondary duct Du2.

As shown in the enlarged view of FIG. 5A, the throttle device comprises, as its main elements: the tube body 10 joined to the ducts of the above-described refrigeration cycle system; a guide tube 28 fixed to the inner peripheral part of the tube body 10; a valve seat 28V formed integrally with an end portion of the guide tube 28 located close to the primary duct Du1 and constituting the refrigerant flow rate adjustment unit that adjusts the flow rate of the refrigerant; a needle member 30; the coil spring 16 which biases the needle member 30 in the direction to come close to the valve seat 28V; the spring receiving portion 12 (not shown) which supports the one end portion of the coil spring 16; and the stopper member 22 which receives a large diameter portion 30PS of the needle member 30.

The projection formed in conjunction with the cavity 10CA1 of the tube body 10 provided by caulking bites into and thus fixes an outer peripheral part of the guide tube 28. The guide tube 28 is made of any of a copper pipe, a brass pipe, an aluminum pipe, and a stainless steel pipe, for example. The guide tube 28 has: the spring receiving portion 12 located at an end portion close to the other end 10E2 of the tube body 10; and the stopper member 22 provided at an inner peripheral part which is located at an end portion close to the one end 10E1 of the tube body 10.

First communication holes (not shown) and second communication holes 28c to establish communication of the inner peripheral part of the guide tube 28 with a portion between the inner peripheral part of the tube body 10 and the outer peripheral part of the guide tube 28 are formed between the spring receiving portion 12 and the stopper member 22. A diameter of each second communication hole 28c is set larger than a diameter of each first communication hole.

Figure 5B:
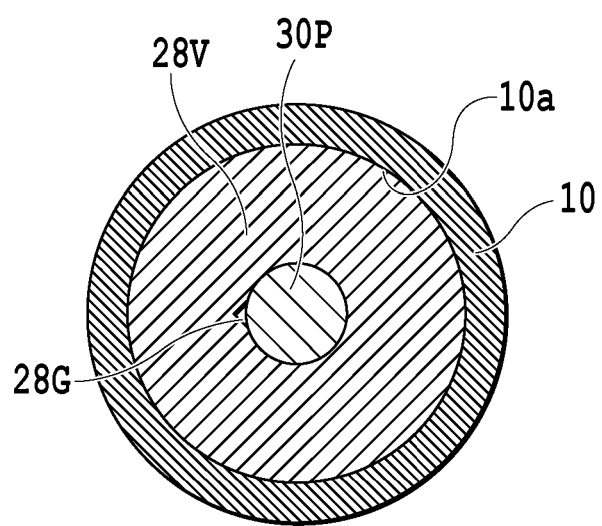
FIG. 5B is a cross-sectional view taken along VB-VB line in the partial cross-sectional view shown in FIG. 5A.

The valve seat 28V formed between the stopper member 22 and the second communication holes 28c in the guide tube 28 has a valve port 28P which is located at an inner central part and into which a tapered portion 30P of the needle member 30 to be described later is inserted. The valve port 28P has a predetermined diameter, and is formed to diverge toward the one end 10E1 along the center axis of the valve seat 28V. Moreover, as shown in FIG. 5B, a notch portion having a substantially V-shaped cross section, that is, a groove 28G is formed at one position on the periphery of the valve port 28P. The groove 28G may be formed by thrusting a dedicated jig provided with a protrusion corresponding to the groove into the valve port 28P at a predetermined pressure, for example.

Hereby, when the needle member 30 is moving, a pressure attributed to the groove 28G acts in a direction indicated with an arrow in FIG. 5A on the tapered portion 30P of the needle member 30, and thus brings about a tilted state of an attitude of the needle member 30. Therefore, sliding resistance is generated between a part A as well as a part B at an outer peripheral part of a body portion 30B of the needle member 30 and the inner peripheral part of the guide tube 28. In other words, a clearance between the groove 28G and the periphery of the valve port constitutes braking means for inducing the pressure of the refrigerant such that the part A and the part B of the outer peripheral part mentioned above is pressed against the inner peripheral surface 18a of the guide tube 18.

The needle member 30 is made of brass or stainless steel, for example. The needle member 30 comprises: the body portion 30B having a columnar shape; the tapered portion 30P formed at an end portion of the body portion 30B opposed to the valve seat 28V; and a spring guide portion 30E having a shape of a projection formed at an end portion of the body portion 30B opposed to the other end portion of the coil spring 16.

A junction portion between the body portion 30B and the tapered portion 30P is opposed to the second communication holes 28c. The other end portion of the coil spring 16 is engaged with the spring guide portion 30E of the needle member 30. Moreover, the spring guide portion 12b is engaged with the one end portion of the coil spring 16. A front end of the spring guide portion 30E and the front end of the spring guide portion 12b are located away from each other by a predetermined distance. Hereby, if the needle member 30 is moved toward the spring guide portion 12b by a predetermined value or more, the movement of the needle member 30 is restricted because the front end of the spring guide portion 30E comes into contact with the front end of the spring guide portion 12b. As a consequence, the coil spring 16 is prevented from being excessively compressed to a predetermined value or above.

The tapered portion 30P having a truncated conical shape with a predetermined taper angle has a base portion, which has a larger diameter than the diameter of the valve port 28P, the base portion located at a position away from the valve port 28P. A taper with its outside diameter gradually reduced toward a front end of the tapered portion 30P is provided at a boundary portion between the body portion 30B and the base portion of the tapered portion 30P. This taper is opposed to the second communication holes 28c as described previously, and is chamfered so that a fluid passing through a throttle portion to be described later can easily flow into the second communication holes 28c. A columnar portion having a constant diameter is formed by a predetermined length at an end portion of the tapered portion 30P having the smallest diameter. A length from a position of the tapered portion 30P corresponding to an open end portion of the valve port 28P to the above-mentioned columnar portion thereof is set to a predetermined length. This makes it possible to increase a valve opening degree in response to the differential pressure (the difference between the inlet pressure of the refrigerant on the one end 10E1 side and the outlet pressure of the refrigerant on the other end 10E2 side). Moreover, since turbulence of the fluid is small, a level of a generated sound pressure is suppressed at the time of passage of the refrigerant.

At the extreme tip of the tapered portion 30P extending toward the stopper member 22, there is formed the large diameter portion 30PS which has a diameter larger than a diameter in the vicinity of the columnar portion and slightly smaller than the diameter of the valve port 28P. A thickness of the large diameter portion 30PS is set to a predetermined value.

At a position where an outer peripheral part of the tapered portion 30P of the needle member 30 corresponds to the open end portion of the valve port 28P, the outer peripheral part of the tapered portion 30P is disposed to form a predetermined clearance with the periphery of the open end portion of the valve port 28P. The large diameter portion 30PS is brought into contact with the flat surface of the stopper member 22 with a predetermined pressure that corresponds to a difference between the biasing force of the coil spring 16 and the pressure of the refrigerant from the primary duct Du1. When the outer peripheral part of the tapered portion 30P of the needle member 30 is located away from the periphery of the open end portion of the valve port 28P as described above, the throttle portion is formed between the tapered portion 30P of the needle member 30 and the open end portion of the valve port 28P. The throttle portion is defined as a location (the narrowest portion) where an intersection point of a perpendicular line extending from the periphery of the valve port 28P to a generatrix of the tapered portion 30P with the generatrix of the tapered portion 30P is closest from an edge of the valve port 28P. An area of a conical surface drawn with this perpendicular line is equivalent to an opening area of the throttle portion.

Thereby, a predetermined bleed amount passing through the throttle portion is set. Moreover, since the large diameter portion 30PS of the tapered portion 30P of the needle member 30 is brought into contact with the flat surface of the stopper member 22, the tapered portion 30P of the needle member 30 is prevented from biting at the open end of the valve port 28P of the valve seat 28V due to an undesired pressure acting on the needle member 30.

In this configuration, in the case where the force applied to the needle member 30 by the pressure of the refrigerant does not exceed the biasing force of the coil spring 16 as shown in FIG. 3, the pressure of the refrigerant supplied through the primary duct Du1 and along the direction indicated with the arrows therein is reduced because the refrigerant passes through the one end 10E1 of the tube body 10, the clearances between the respective flat surfaces 22fs of the stopper member 22 and an inner peripheral part 28a of the guide tube 28, the above-mentioned throttle portion, and the groove 28G. Thereafter, the refrigerant at the predetermined bleed amount is discharged from the other end 10E2 through the second communication holes 28c as well as the clearance between the outer peripheral part of the guide tube 28 and the inner peripheral part 10a of the tube body 10.

Furthermore, in the case where the force applied to the needle member 30 by the pressure of the refrigerant exceeds the biasing force of the coil spring 16, the refrigerant that flows through the above-mentioned throttle portion presses the needle member 30 in a direction to move the needle member 30 further away from the periphery of the valve port 28P. At that time, sliding resistance is generated as a consequence of the fact that a working pressure of the refrigerant acting on the groove 28G, which further acts in the radial direction of the tapered portion 30P and presses the part A and the part B of the outer peripheral part of the body portion 30B against corresponding portions on the inner peripheral surface 28a of the guide tube 28. Hence, the flow rate is changed with the so-called hysteresis, and occurrence of hunting is thus suppressed.

Figure 6A:
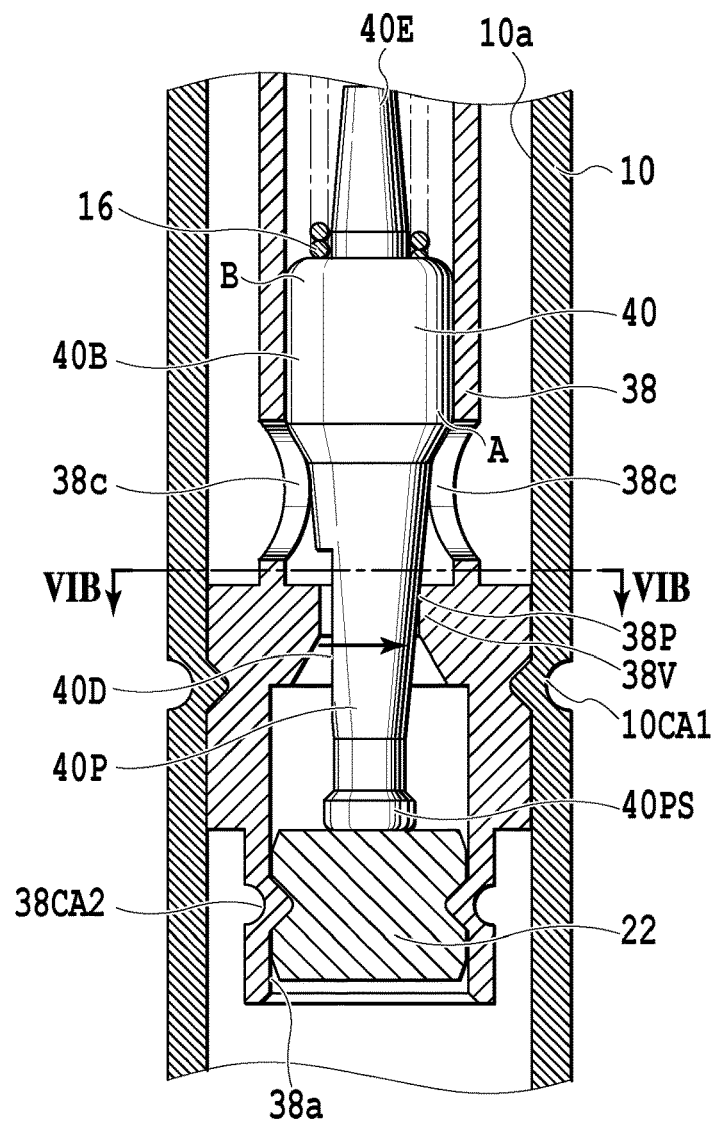
FIG. 6A is a partial enlarged cross-sectional view showing a part of a configuration of a third embodiment of a throttle device according to the present invention.

FIG. 6A shows a main part of a configuration of a throttle device according to a third embodiment of the present invention. Note that constituents in FIG. 6A which are the same as those in the example shown in FIG. 1A are denoted with the same reference signs and duplicate explanation thereof will be omitted.

In FIG. 6A, the throttle device is disposed between the outlet of the condenser 6 and the inlet of the evaporator 2 among the ducts of the refrigeration cycle system as shown in FIG. 3, for example. Moreover, in the throttle device, the one end 10E1 of the tube body 10 to be described later is joined to the primary duct Du1 and the other end 10E2 of the tube body 10 from which the refrigerant is discharged is joined to the secondary duct Du2.

As shown in the enlarged view of FIG. 6A, the throttle device comprises, as its main elements: the tube body 10 joined to the ducts of the above-described refrigeration cycle system; a guide tube 38 fixed to the inner peripheral part of the tube body 10; a valve seat 38V formed integrally with an end portion of the guide tube 38 located close to the primary duct Du1 and constituting the refrigerant flow rate adjustment unit that adjusts the flow rate of the refrigerant; a needle member 40; the coil spring 16 which biases the needle member 40 in the direction to come close to the valve seat 38V; the spring receiving portion 12 (not shown) which supports the one end portion of the coil spring 16; and the stopper member 22 which receives a large diameter portion 40PS of the needle member 40.

The projection formed in conjunction with the cavity 10CA1 of the tube body 10 provided by caulking bites into and thus fixes an outer peripheral part of the guide tube 38. The guide tube 38 is made of any of a copper pipe, a brass pipe, an aluminum pipe, and a stainless steel pipe, for example. The guide tube 38 has: the spring receiving portion 12 located at an end portion close to the other end 10E2 of the tube body 10; and the stopper member 22 provided at an inner peripheral part which is located at an end portion close to the one end 10E1 of the tube body 10.

First communication holes (not shown) and second communication holes 38c to establish communication of the inner peripheral part of the guide tube 38 with a portion between the inner peripheral part of the tube body 10 and the outer peripheral part of the guide tube 38 are formed between the spring receiving portion 12 and the stopper member 22. A diameter of each second communication hole 38c is set larger than a diameter of each first communication hole.

The valve seat 38V formed between the stopper member 22 and the second communication holes 38c in the guide tube 38 has a valve port 38P located at an inner central part and, into which a tapered portion 40P of the needle member 40 to be described later is inserted. The valve port 38P has a predetermined diameter, and is formed to diverge toward the one end 10E1 along the center axis of the valve seat 38V.

The needle member 40 is made of brass or stainless steel, for example. The needle member 40 comprises: a body portion 40B having a columnar shape; the tapered portion 40P formed at an end portion of the body portion 40B opposed to the valve seat 38V; and a spring guide portion 40E having a shape of a projection formed at an end portion of the body portion 40B opposed to the other end portion of the coil spring 16.

A junction portion between the body portion 40B and the tapered portion 40P is opposed to the second communication holes 38c. The other end portion of the coil spring 16 is engaged with the spring guide portion 40E of the needle member 40. Moreover, the spring guide portion 12b is engaged with the one end portion of the coil spring 16. A front end of the spring guide portion 40E and the front end of the spring guide portion 12b are located away from each other by a predetermined distance. Hereby, if the needle member 40 is moved toward the spring guide portion 12b by a predetermined value or more, the movement of the needle member 40 is restricted because the front end of the spring guide portion 40E comes into contact with the front end of the spring guide portion 12b. As a consequence, the coil spring 16 is prevented from being excessively compressed to a predetermined value or above.

The tapered portion 40P having a truncated conical shape with a predetermined taper angle has a base portion, which has a larger diameter than the diameter of the valve port 38P, the base portion located at a position away from the valve port 38P. A taper with its outside diameter gradually reduced toward a front end of the tapered portion 40P is provided at a boundary portion between the body portion 40B and the base portion of the tapered portion 40P. This taper is opposed to the second communication holes 38c as described previously, and is chamfered so that a fluid passing through a throttle portion to be described later can easily flow into the second communication holes 38c. A columnar portion having a constant diameter is formed by a predetermined length at an end portion of the tapered portion 40P having the smallest diameter. A length from a position of the tapered portion 40P corresponding to an open end portion of the valve port 38P to the above-mentioned columnar portion thereof is set to a predetermined length. This makes it possible to increase a valve opening degree in response to the differential pressure (the difference between the inlet pressure of the refrigerant on the one end 10E1 side and the outlet pressure of the refrigerant on the other end 10E2 side). Moreover, since turbulence of the fluid is small, a level of a generated sound pressure is suppressed at the time of passage of the refrigerant.

Figure 6B:
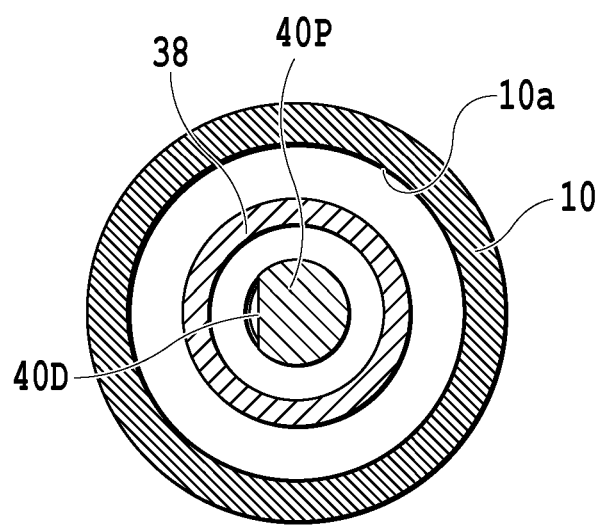
FIG. 6B is a cross-sectional view taken along XIB-XIB line in the partial cross-sectional view shown in FIG. 6A.

As shown in FIG. 6B, the tapered portion 40P has a flat surface 40D located at a position away by a predetermined distance from the center axis. The flat surface 40D is formed by a predetermined length along the center axis of the tapered portion 40P from the vicinity of its intermediate part to a boundary with the columnar portion. Hereby, a working pressure of the refrigerant present between the periphery of the port 38P and the flat surface 40D acts in a radial direction of the tapered portion 40P, which is a direction indicated with an arrow, and presses a part A on an outer peripheral surface of the body portion 40B located on an outer peripheral surface side of the tapered portion 40P located opposite from the flat surface 40D, and apart B located obliquely upward to the left from the part A against an inner peripheral surface 38a of the guide tube 38. Hereby, when the needle member 40 is moving, sliding resistance is generated between the outer peripheral surface of the body portion 40B and the inner peripheral surface 38a of the guide tube 38. In other words, a clearance formed between the flat surface 40D and the periphery of the valve port constitutes braking means for inducing the pressure of the refrigerant such that the part A and the part B of the outer peripheral part mentioned above is pressed against the inner peripheral surface 38a of the guide tube 38.

At the extreme tip of the tapered portion 40P extending toward the stopper member 22, there is formed the large diameter portion 40PS which has a diameter larger than a diameter in the vicinity of the columnar portion and slightly smaller than the diameter of the valve port 38P. A thickness of the large diameter portion 40PS is set to a predetermined value.

At a position where an outer peripheral part of the tapered portion 40P of the needle member 40 corresponds to the open end portion of the valve port 38P, the outer peripheral part of the tapered portion 40P is disposed to form a predetermined clearance with the periphery of the open end portion of the valve port 38P. The large diameter portion 40PS is brought into contact with the flat surface of the stopper member 22 with the predetermined pressure that corresponds to the difference between the biasing force of the coil spring 16 and the pressure of the refrigerant from the primary duct Du1. When the outer peripheral part of the tapered portion 40P of the needle member 40 is located away from the periphery of the open end portion of the valve port 38P as described above, the throttle portion is formed between the tapered portion 40P of the needle member 40 and the open end portion of the valve port 38P. The throttle portion is defined as a location (the narrowest portion) where an intersection point of a perpendicular line extending from the periphery of the valve port 38P to a generatrix of the tapered portion 30P with the generatrix of the tapered portion 30P is closest from an edge of the valve port 38P. An area of a conical surface drawn with this perpendicular line is equivalent to an opening area of the throttle portion.

Thereby, a predetermined bleed amount passing through the throttle portion is set. Moreover, since the large diameter portion 40PS of the tapered portion 40P of the needle member 40 is brought into contact with the flat surface of the stopper member 22, the tapered portion 40P of the needle member 40 is prevented from biting at the open end of the valve port 38P of the valve seat 38V due to an undesired pressure acting on the needle member 40.

In this configuration, in the case where the force applied to the needle member 40 by the pressure of the refrigerant does not exceed the biasing force of the coil spring 16 as shown in FIG. 3, as the refrigerant is supplied through the primary duct Du1 and along the direction indicated with the arrows therein, the pressure of the refrigerant is reduced because the refrigerant passes through the one end 10E1 of the tube body 10, the clearances between the respective flat surfaces 22fs of the stopper member 22 and the inner peripheral part 38a of the guide tube 38, the above-mentioned throttle portion, and the clearance between the flat surface 40D and the periphery of the valve port 38P. Thereafter, the refrigerant at the predetermined bleed amount is discharged from the other end 10E2 through the second communication holes 38c as well as the clearance between the outer peripheral part of the guide tube 38 and the inner peripheral part 10a of the tube body 10.

Furthermore, in the case where the force applied to the needle member 40 by the pressure of the refrigerant exceeds the biasing force of the coil spring 16, the refrigerant that flows through the above-mentioned throttle portion presses the needle member 40 in a direction to move the needle member 40 further away from the periphery of the valve port 38P. At that time, sliding resistance is generated as a consequence of the fact that a working pressure of the refrigerant acting on the clearance between the flat surface 40D and the periphery of the valve port 38P, which acts in the radial direction of the tapered portion 40P and presses the part A and the part B of the outer peripheral part of the body portion 40B against corresponding portions on the inner peripheral surface 38a of the guide tube 38. Hence, the flow rate is changed with the so-called hysteresis, and occurrence of hunting is thus suppressed.

Figure 7:
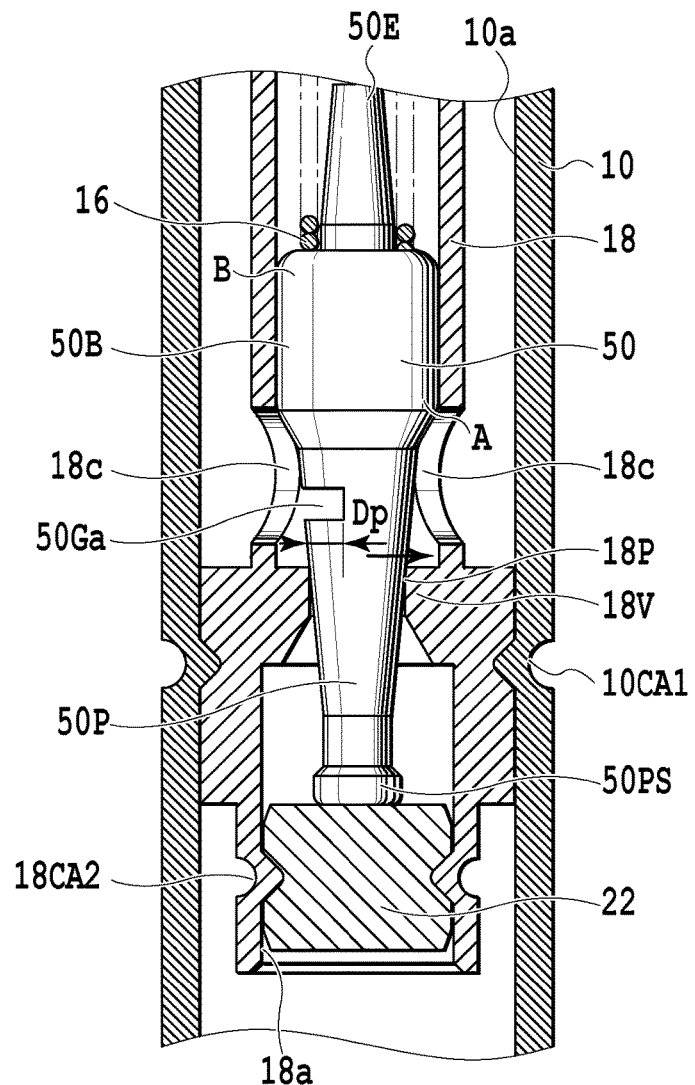
FIG. 7 is a partial enlarged cross-sectional view showing apart of a configuration of a fourth embodiment of a throttle device according to the present invention.

FIG. 7 shows a main part of a configuration of a fourth embodiment of a throttle device according to the present invention. Note that constituents in FIG. 7 which are the same as those in the example shown in FIG. 1A are denoted with the same reference signs and duplicate explanation thereof will be omitted.

In FIG. 7, the throttle device is disposed between the outlet of the condenser 6 and the inlet of the evaporator 2 among the ducts of the refrigeration cycle system as shown in FIG. 3, for example. Moreover, in the throttle device, the one end 10E1 of the tube body 10 to be described later is joined to the primary duct Du1 and the other end 10E2 of the tube body 10 from which the refrigerant is discharged is joined to the secondary duct Du2.

As shown in the enlarged view of FIG. 7, the throttle device comprises, as its main elements: the tube body 10 joined to the ducts of the above-described refrigeration cycle system; the guide tube 18 fixed to the inner peripheral part of the tube body 10; the valve seat 18V formed integrally with the end portion of the guide tube 18 located close to the primary duct Du1 and constituting the refrigerant flow rate adjustment unit that adjusts the flow rate of the refrigerant; a needle member 50; the coil spring 16 which biases the needle member 50 in the direction to come close to the valve seat 18V; the spring receiving portion 12 (not shown) which supports the one end portion of the coil spring 16; and the stopper member 22 which receives a large diameter portion 50PS of the needle member 50.

The needle member 50 is made of brass or stainless steel, for example. The needle member 50 comprises: a body portion 50B having a columnar shape; a tapered portion 50P formed at an end portion of the body portion 50B opposed to the valve seat 18V; and a spring guide portion 50E having a shape of a projection formed at an end portion of the body portion 50B opposed to the other end portion of the coil spring 16.

A junction portion between the body portion 50B and the tapered portion 50P is opposed to the second communication holes 18c. The other end portion of the coil spring 16 is engaged with the spring guide portion 50E of the needle member 50. Moreover, the spring guide portion 12b is engaged with the one end portion of the coil spring 16. A front end of the spring guide portion 50E and the front end of the spring guide portion 12b are located away from each other by a predetermined distance. Hereby, if the needle member 50 is moved toward the spring guide portion 12b by a predetermined value or more, the movement of the needle member 50 is restricted because the front end of the spring guide portion 50E comes into contact with the front end of the spring guide portion 12b. As a consequence, the coil spring 16 is prevented from being excessively compressed to a predetermined value or above.

The tapered portion 50P having a truncated conical shape with a predetermined taper angle has a base portion, which has a larger diameter than the diameter of the valve port 18P, is the base portion located at a position away from the valve port 18P. A taper with its outside diameter gradually reduced toward a front end of the tapered portion 50P is provided at a boundary portion between the body portion 50B and the base portion of the tapered portion 50P. This taper is opposed to the second communication holes 18c as described previously, and is chamfered so that a fluid passing through a throttle portion to be described later can easily flow into the second communication holes 18c. A columnar portion having a constant diameter is formed by a predetermined length at an end portion of the tapered portion 50P having the smallest diameter. A length from a position of the tapered portion 50P corresponding to the open end portion of the valve port 18P to the above-mentioned columnar portion thereof is set to a predetermined length. This makes it possible to increase a valve opening degree in response to the differential pressure (the difference between the inlet pressure of the refrigerant on the one end 10E1 side and the outlet pressure of the refrigerant on the other end 10E2 side). Moreover, since turbulence of the fluid is small, a level of a generated sound pressure is suppressed at the time of passage of the refrigerant.

As shown in FIG. 7, at a position of the tapered portion 50P adjacent to the above-mentioned chamfered portion, a groove 50Ga is formed to penetrate in a radial direction of the tapered portion 50P. The groove 50Ga having a substantially U-shaped cross section is opened toward one of the second communication holes 18c that are opposed to each other. A depth Dp of the groove 50Ga is set to a depth that does not reach the center axis of the tapered portion 50P. Thereby, a working pressure of the refrigerant acting on the groove 50Ga further acts in the radial direction of the tapered portion 50P, which is a direction indicated with an arrow, and presses a part A on an outer peripheral surface of the body portion 50B located on an outer peripheral surface side of the tapered portion 50P located opposite from the groove 50Ga, and a part B located obliquely upward to the left from the part A against the inner peripheral surface 18a of the guide tube 18. Hereby, when the needle member 50 is moving, sliding resistance is generated between the outer peripheral surface of the body portion 50B and the inner peripheral surface 18a of the guide tube 18. In other words, the groove 50Ga constitutes braking means for inducing the pressure of the refrigerant such that the part A and the part B of the outer peripheral part mentioned above is pressed against the inner peripheral surface 18a of the guide tube 18. Note that the groove 50Ga is not limited to the above-described example. For instance, the groove 50Ga does not have to face any of the two second communication holes 18c opposed to each other but may instead be opened to an another direction. Moreover, the number of the second communication holes 18c is not limited to the above-described example, and at least one communication hole 18c may be formed instead.

At the extreme tip of the tapered portion 50P extending toward the stopper member 22, there is formed the large diameter portion 50PS which has a diameter larger than a diameter in the vicinity of the columnar portion and slightly smaller than the diameter of the valve port 18P. A thickness of the large diameter portion 50PS is set to a predetermined value.

At a position where an outer peripheral part of the tapered portion 50P of the needle member 50 corresponds to the open end portion of the valve port 18P, the outer peripheral part of the tapered portion 50P is disposed to form a predetermined clearance with the periphery of the open end portion of the valve port 18P. The large diameter portion 50PS is brought into contact with the flat surface of the stopper member 22 with the predetermined pressure that corresponds to the difference between the biasing force of the coil spring 16 and the pressure of the refrigerant from the primary duct Du1. When the outer peripheral part of the tapered portion 50P of the needle member 50 is located away from the periphery of the open end portion of the valve port 18P as described above, the throttle portion is formed between the tapered portion 50P of the needle member 50 and the open end portion of the valve port 18P. The throttle portion is defined as a location (the narrowest portion) where an intersection point of a perpendicular line extending from the periphery of the valve port 18P to a generatrix of the tapered portion 50P with the generatrix of the tapered portion 50P is closest from the edge of the valve port 18P. An area of a conical surface drawn with this perpendicular line is equivalent to an opening area of the throttle portion.

Thereby, a predetermined bleed amount passing through the throttle portion is set. Moreover, since the large diameter portion 50PS of the tapered portion 50P of the needle member 50 is brought into contact with the flat surface of the stopper member 22, the tapered portion 50P of the needle member 50 is prevented from biting at the open end of the valve port 18P of the valve seat 18V due to an undesired pressure acting on the needle member 50.

In this configuration, in the case where the force applied to the needle member 50 by the pressure of the refrigerant does not exceed the biasing force of the coil spring 16 as shown in FIG. 3, as the refrigerant is supplied through the primary duct Du1 and along the direction indicated with the arrows therein, the pressure of the refrigerant is reduced because the refrigerant passes through the one end 10E1 of the tube body 10, the clearances between the respective flat surfaces 22fs of the stopper member 22 and the inner peripheral part 18a of the guide tube 18, and the above-mentioned throttle portion. Thereafter, the refrigerant at the predetermined bleed amount is discharged from the other end 10E2 through the second communication holes 18c as well as the clearance between the outer peripheral part of the guide tube 18 and the inner peripheral part 10a of the tube body 10.

Furthermore, in the case where the force applied to the needle member 50 by the pressure of the refrigerant exceeds the biasing force of the coil spring 16, the refrigerant that flows through the above-mentioned throttle portion presses the needle member 50 in a direction to move the needle member 50 further away from the periphery of the valve port 18P. In that time, sliding resistance is generated as a consequence of the fact that a working pressure of the refrigerant acting on the inside of the groove 50Ga, which further acts in the radial direction of the tapered portion 50P and presses the part A and the part B of the outer peripheral part of the body portion 50B against corresponding portions on the inner peripheral surface 18a of the guide tube 18. Hence, the flow rate is changed with the so-called hysteresis, and occurrence of hunting is thus suppressed.

Figure 8:
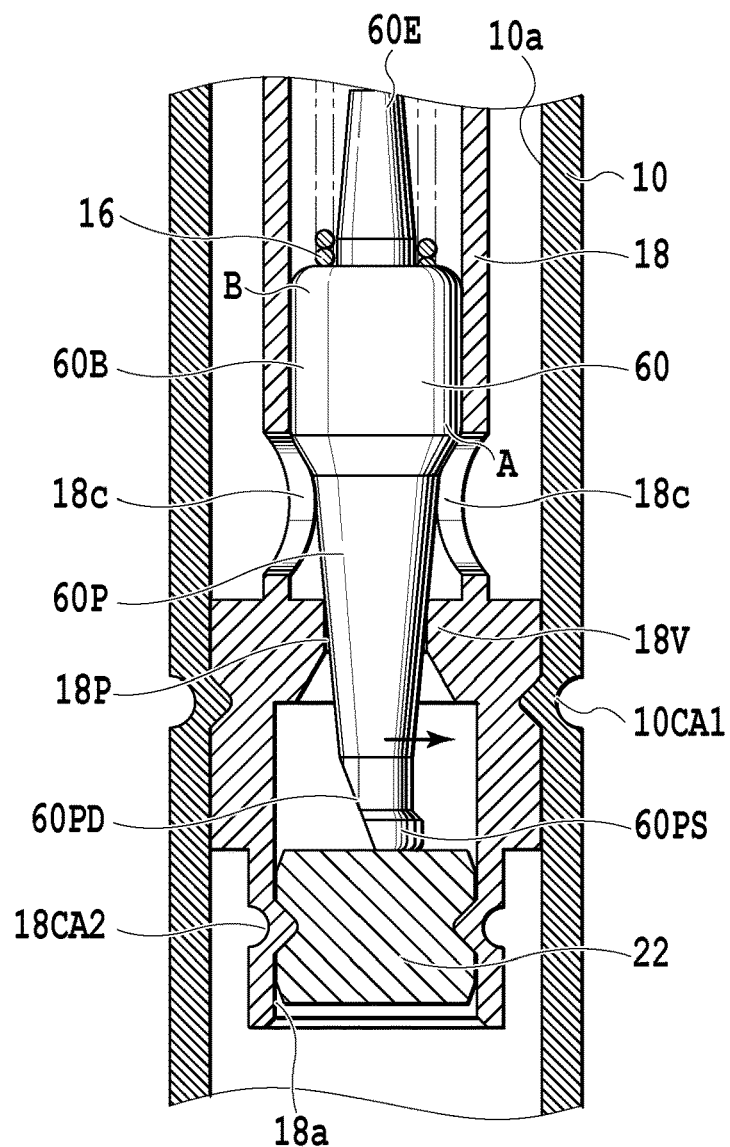
FIG. 8 is a partial enlarged cross-sectional view showing apart of a configuration of a fifth embodiment of a throttle device according to the present invention.

FIG. 8 shows a main part of a configuration of a fifth embodiment of a throttle device according to the present invention. Note that constituents in FIG. 8 which are the same as those in the example shown in FIG. 1A are denoted with the same reference signs and duplicate explanation thereof will be omitted.

In FIG. 8, the throttle device is disposed between the outlet of the condenser 6 and the inlet of the evaporator 2 among the ducts of the refrigeration cycle system as shown in FIG. 3, for example. Moreover, in the throttle device, the one end 10E1 of the tube body 10 is joined to the primary duct Du1 and the other end 10E2 of the tube body 10 from which the refrigerant is discharged is joined to the secondary duct Du2.

As shown in the enlarged view of FIG. 8, the throttle device comprises, as its main elements: the tube body 10 joined to the ducts of the above-described refrigeration cycle system; the guide tube 18 fixed to the inner peripheral part of the tube body 10; the valve seat 18V formed integrally with the end portion of the guide tube 18 located close to the primary duct Du1 and constituting the refrigerant flow rate adjustment unit that adjusts the flow rate of the refrigerant; a needle member 60; the coil spring 16 which biases the needle member 60 in the direction to come close to the valve seat 18V; the spring receiving portion 12 (not shown) which supports the one end portion of the coil spring 16; and the stopper member 22 which receives a large diameter portion 60PS of the needle member 60.

The needle member 60 is made of brass or stainless steel, for example. The needle member 60 comprises: a body portion 60B having a columnar shape; a tapered portion 60P formed at an end portion of the body portion 60B opposed to the valve seat 18V; and a spring guide portion 60E having a shape of a projection formed at an end portion of the body portion 60B opposed to the other end portion of the coil spring 16.

A junction portion between the body portion 60B and the tapered portion 60P is opposed to the second communication holes 18c. The other end portion of the coil spring 16 is engaged with the spring guide portion 60E of the needle member 60. Moreover, the spring guide portion 12b is engaged with the one end portion of the coil spring 16. A front end of the spring guide portion 60E and the front end of the spring guide portion 12b are located away from each other by a predetermined distance. Hereby, if the needle member 60 is moved toward the spring guide portion 12b by a predetermined value or more, the movement of the needle member 60 is restricted because the front end of the spring guide portion 60E comes into contact with the front end of the spring guide portion 12b. As a consequence, the coil spring 16 is prevented from being excessively compressed to a predetermined value or above.

The tapered portion 60P having a truncated conical shape with a predetermined taper angle has a base portion, which has a larger diameter than the diameter of the valve port 18P, is the base portion located at a position away from the valve port 18P. A taper with its outside diameter gradually reduced toward a front end of the tapered portion 60P is provided at a boundary portion between the body portion 60B and the base portion of the tapered portion 60P. This taper is opposed to the second communication holes 18c as described previously, and is chamfered so that a fluid passing through a throttle portion to be described later can easily flow into the second communication holes 18c. A columnar portion having a constant diameter is formed by a predetermined length at an end portion of the tapered portion 60P having the smallest diameter. A length from a position of the tapered portion 60P corresponding to the open end portion of the valve port 18P to the above-mentioned columnar portion thereof is set to a predetermined length. This makes it possible to increase a valve opening degree in response to the differential pressure (the difference between the inlet pressure of the refrigerant on the one end 10E1 side and the outlet pressure of the refrigerant on the other end 10E2 side). Moreover, since turbulence of the fluid is small, a level of a generated sound pressure is suppressed at the time of passage of the refrigerant.

At the extreme tip of the tapered portion 60P extending toward the stopper member 22, there is formed a contact portion 60PS which has a diameter slightly smaller than the diameter of the valve port 18P. Moreover, the above-mentioned columnar portion and the contact portion 60PS are provided with a slant surface portion 60PD having a predetermined gradient. In FIG. 8, the slant surface portion 60PD is formed to traverse the columnar portion and the contact portion 60PS from an upper left side to a lower right side, for example. Hereby, a working pressure of the refrigerant acting on the slant surface portion 60PD further acts in the radial direction of the tapered portion 60P, which is a direction indicated with an arrow, and presses a part A on an outer peripheral surface of the body portion 60B located on an outer peripheral surface side of the tapered portion 60P located opposite from the slant surface portion 60PD, and a part B located obliquely upward to the left from the part A against the inner peripheral surface 18a of the guide tube 18. Hereby, when the needle member 60 is moving, sliding resistance is generated between the outer peripheral surface of the body portion 60B and the inner peripheral surface 18a of the guide tube 18. In other words, the slant surface portion 60PD constitutes braking means for inducing the pressure of the refrigerant such that the part A and the part B of the outer peripheral part mentioned above is pressed against the inner peripheral surface 18a of the guide tube 18.

At a position where an outer peripheral part of the tapered portion 60P of the needle member 60 corresponds to the open end portion of the valve port 18P, the outer peripheral part of the tapered portion 60P is disposed to form a predetermined clearance with the periphery of the open end portion of the valve port 18P. When the outer peripheral part of the tapered portion 60P of the needle member 60 is located away from the periphery of the open end portion of the valve port 18P as described above, the throttle portion is formed between the tapered portion 60P of the needle member 60 and the open end portion of the valve port 18P. The throttle portion is defined as a location (the narrowest portion) where an intersection point of a perpendicular line extending from the periphery of the valve port 18P to a generatrix of the tapered portion 60P with the generatrix of the tapered portion 60P is closest from the edge of the valve port 18P. An area of a conical surface drawn with this perpendicular line is equivalent to an opening area of the throttle portion.

Thereby, a predetermined bleed amount passing through the throttle portion is set. Moreover, since the contact portion 60PS of the tapered portion 60P of the needle member 60 is brought into contact with the flat surface of the stopper member 22, the tapered portion 60P of the needle member 60 is prevented from biting at the open end of the valve port 18P of the valve seat 18V due to an undesired pressure acting on the needle member 60.

In this configuration, in the case where the force applied to the needle member 60 by the pressure of the refrigerant does not exceed the biasing force of the coil spring 16 as shown in FIG. 3, as the refrigerant is supplied through the primary duct Du1 and along the direction indicated with the arrows therein, the pressure of the refrigerant is reduced because the refrigerant passes through the one end 10E1 of the tube body 10, the clearances between the respective flat surfaces 22fs of the stopper member 22 and the inner peripheral part 18a of the guide tube 18, and the above-mentioned throttle portion. Thereafter, the refrigerant at the predetermined bleed amount is discharged from the other end 10E2 through the second communication holes 18c as well as the clearance between the outer peripheral part of the guide tube 18 and the inner peripheral part 10a of the tube body 10.

Furthermore, in the case where the force applied to the needle member 60 by the pressure of the refrigerant exceeds the biasing force of the coil spring 16, the refrigerant that flows through the above-mentioned throttle portion presses the needle member 60 in a direction to move the needle member 60 further away from the periphery of the valve port 18P. At that time, sliding resistance is generated as a consequence of the fact that a working pressure of the refrigerant acting on the slant surface portion 60PD, which further acts in the radial direction of the tapered portion 60P and presses the part A and the part B of the outer peripheral part of the body portion 60B against corresponding portions on the inner peripheral surface 18a of the guide tube 18. Hence, the flow rate of the refrigerant is changed with the so-called hysteresis, and occurrence of hunting is thus suppressed.

Figure 9:
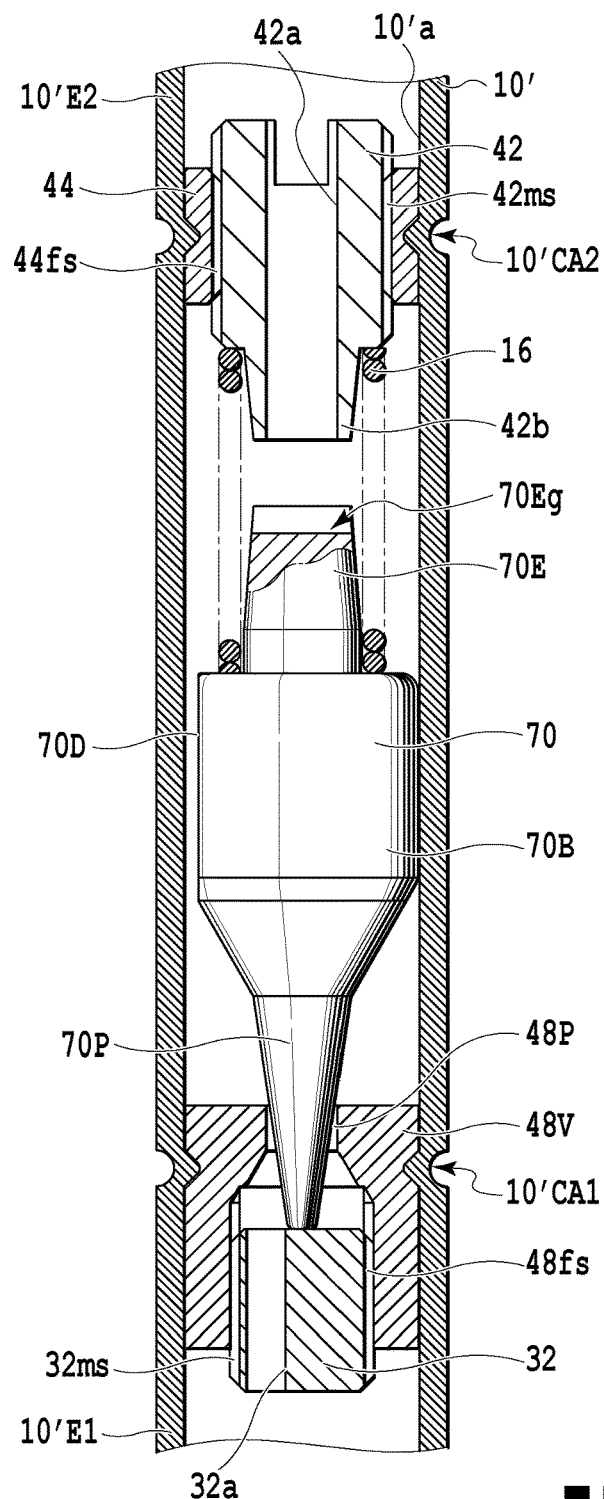
FIG. 9 is a partial enlarged cross-sectional view showing apart of a configuration of a sixth embodiment of a throttle device according to the present invention.

FIG. 9 shows a main part of a configuration of a sixth embodiment of a throttle device according to the present invention. Note that constituents in FIG. 9 which are the same as those in the example shown in FIG. 1A are denoted with the same reference signs and duplicate explanation thereof will be omitted.

As with the example shown in FIG. 1A, the throttle device is disposed between an outlet of a condenser and an inlet of an evaporator among ducts of a refrigeration cycle system. In the throttle device, one end 10'E1 of a tube body 10' to be described later is joined to a primary duct and another end 10'E2 of the tube body 10' from which a refrigerant is discharged is joined to a secondary duct.

The throttle device comprises, as its main elements: the tube body 10' joined to the ducts of the above-described refrigeration cycle system; a valve seat 48V provided at an inner peripheral part of the one end 10'E1 of the tube body 10' located close to the primary duct and constituting a refrigerant flow rate adjustment unit that adjusts a flow rate of the refrigerant; a needle member 70; the coil spring 16 which biases the needle member 70 in the direction to come close to the valve seat 48V; a biasing force adjustment screw mechanism which supports the one end portion of the coil spring 16 and adjusts the biasing force of the coil spring 16; and a stopper member 32 which receives a contact portion formed at the extreme tip of a tapered portion 70P of the needle member 70.

The tube body 10' having a predetermined length and a predetermined diameter is made of any of a copper pipe, a stainless steel pipe, and an aluminum pipe, for example. The one end 10'E1 of the tube body 10' through which the refrigerant is injected is joined to the primary duct connected to the condenser, and the other end 10'E2 thereof from which the refrigerant is discharged is joined to the secondary duct connected to the evaporator.

As shown in FIG. 9, an outer peripheral part of the valve seat 48V is fixed to an intermediate portion located at a predetermined distance away from the one end 10'E1 of the inner peripheral part of the tube body 10'. A projection formed in conjunction with a cavity 10'CA1 of the tube body 10' provided by caulking bites into and thus fixes the outer peripheral part of the valve seat 48V.

The valve seat 48V has a valve port 48P which is located at an inner central part and into which the tapered portion 70P of the needle member 70 to be described later is inserted. The valve port 48P has a predetermined diameter, and is formed to diverge toward the one end 10'E1 along the center axis of the valve seat 48V. A male screw portion 32ms of the stopper member 32 threads into a female screw portion 48fs of a cylindrical portion serving as a cylinder portion on which an inner peripheral surface forming the valve port 48P of the valve seat 48V extends. The columnar stopper member 32 is made of a stainless steel, for example, and has a plurality of through-holes 32a provided at given intervals on a given circumference. Each through-hole 32a penetrates the stopper member 32 along the center axis thereof. Note that FIG. 9 representatively illustrates one through-hole 32a.

Each of two end surfaces of the stopper member 32 has a substantially flat surface. A contact portion to be formed on the extreme tip of the tapered portion 70P of the needle member 70 is brought into contact with one of the two end surfaces of the stopper member 32.

The biasing force adjustment screw mechanism comprises: an adjustment screw support portion 44 fixed to an inner peripheral part of the tube body 10' and provided with a female screw portion 44fs, and an adjustment screw 42 provided with a spring guide portion 42b to be engaged with the other end portion of the coil spring 16.

The adjustment screw 42 has a male screw portion 42ms on its outer peripheral part, and has a through-hole 42a provided at its inner central part. The male screw portion 42ms is mated with a female screw 44fs of the adjustment screw support portion 44 to be fixed to the inner peripheral part of the tube body 10'. A projection formed in conjunction with a cavity 10'CA2 of the tube body 10' provided by caulking bites into and thus fixes the adjustment screw support portion 44. A groove to be engaged with a tip end of a screwdriver is formed at an end portion of the adjustment screw 42 on the side close to the other end 10'E2 of the tube body 10'. Thereby, because the adjustment screw 42 is turned and fed by using the tip end of the screwdriver and an amount of deflection of the coil spring 16 is thus adjusted, the biasing force of the coil spring 16 is adjusted in conformity with a design pressure of the refrigerant. Namely, in the case of a predetermined differential pressure (a difference between an inlet pressure of the refrigerant on the one end 10'E1 side and an outlet pressure of the refrigerant on the other end 10'E2 side), the biasing force of the coil spring 16 is adjusted such that a position of the tapered portion 70P of the needle member 70 is aligned with a position of a prescribed lift of the needle member 70.

The needle member 70 is made of brass or stainless steel, for example. The needle member 70 comprises: a body portion 70B having a columnar shape; the tapered portion 70P formed at an end portion of the body portion 70B opposed to the valve seat 48V; and a spring guide portion 70E having a shape of a projection formed at an end portion of the body portion 70B opposed to the other end of the coil spring 16.

The body portion 70B has a flat surface 70D located at a position a predetermined distance away from its center axis. The flat surface 70D is formed from one end to another end of the body portion 70B along the central axis thereof. Hereby, when the needle member 70 is moving, a working pressure of the refrigerant present between an inner peripheral surface 10'a of the tube body 10' and the flat surface 70D acts in a radial direction of the body portion 70B and presses part of an outer peripheral surface of the body portion 70B located opposite from the flat surface 70D against the inner peripheral surface 10'a of the tube body 10' of the tube body 10'. In other words, a clearance formed between the inner peripheral surface 10'a of the tube body 10' and the flat surface 70D constitutes braking means for inducing the pressure of the refrigerant such that the above-mentioned part of the outer peripheral surface is pressed against the inner peripheral surface 10'a of the tube body 10'. Accordingly, sliding resistance is formed between the outer peripheral surface of the body portion 70B and the inner peripheral surface 10'a of the tube body 10'. Moreover, it is advantageous in terms of wear of the body portion 70B because a contact area between the body portion 70B and the inner peripheral surface 10'a is increased while keeping an attitude of the needle member 70 from tilting.

The other end portion of the coil spring 16 is engaged with the spring guide portion 70E of the needle member 70. The spring guide portion 70E is provided with a slit (a groove) 70Eg that traverses the spring guide portion 70E along a radial direction thereof at the tip of the spring guide portion. Hereby, when a front end of the spring guide portion 70E comes into contact with a front end of the spring guide portion 42b, the refrigerant is discharged to the other end 10'E2 of the tube body 10' through the slit 70Eg and the through-hole 42a in the adjustment screw 42. Moreover, the spring guide portion 42b of the adjustment screw 42 is engaged with the one end portion of the coil spring 16. The front end of the spring guide portion 70E and the front end of the spring guide portion 42b are located away from each other by a predetermined distance. Hereby, if the needle member 70 is moved toward the spring guide portion 42b by a predetermined value or more, the movement of the needle member 70 is restricted because the front end of the spring guide portion 70E comes into contact with the front end of the spring guide portion 42b. As a consequence, the coil spring 16 is prevented from being excessively compressed to a predetermined value or above.

The tapered portion 70P having a truncated conical shape with a predetermined taper angle has a base portion, which has a larger diameter than the diameter of the valve port 48P, is the base portion located at a position away from the valve port 48P. A boundary portion between the body portion 70B and the base portion of the tapered portion 70P is chamfered. A length from a position of the tapered portion 70P corresponding to the open end portion of the valve port 48P to the above-mentioned contact portion thereof is set to a predetermined length. This makes it possible to increase a valve opening degree in response to the differential pressure (the difference between the inlet pressure of the refrigerant on the one end 10'E1 side and the outlet pressure of the refrigerant on the other end 10'E2 side). Moreover, since turbulence of the fluid is small, a level of a generated sound pressure is suppressed at the time of passage of the refrigerant.

When the outer peripheral part of the tapered portion 70P of the needle member 70 is located away from the periphery of the open end portion of the valve port 48P as described above, a throttle portion is formed between the tapered portion 70P of the needle member 70 and the open end portion of the valve port 48P. The throttle portion is defined as a location (the narrowest portion) where an intersection point of a perpendicular line extending from the periphery of the valve port 48P to a generatrix of the tapered portion 70P with the generatrix of the tapered portion 70P is closest from the edge of the valve port 48P. An area of a conical surface drawn with this perpendicular line is equivalent to an opening area of the throttle portion.

Thereby, a predetermined bleed amount passing through the throttle portion is set. Moreover, since the contact portion of the tapered portion 70P of the needle member 70 is brought into contact with the flat surface of the stopper member 32, the tapered portion 70P of the needle member 70 is prevented from biting at the open end of the valve port 48P of the valve seat 48V due to an undesired pressure acting on the needle member 70.

Moreover, a separation start timing at which the outer peripheral part of the tapered portion 70P of the needle member 70 starts moving further away from the periphery of the open end portion of the valve port 48P due to the above-mentioned differential pressure is set on the basis of the biasing force of the coil spring 16 described above.

In this configuration, in the case where the force applied to the needle member 70 by the pressure of the refrigerant does not exceed the biasing force of the coil spring 16 as shown in FIG. 3, as the refrigerant is supplied through the primary duct Du1 and along the direction indicated with the arrows therein, the pressure of the refrigerant is reduced because the refrigerant passes through the one end 10'E1 of the tube body 10', the through-holes 32a in the stopper member 32, and the above-mentioned throttle portion. Thereafter, the refrigerant at the predetermined bleed amount is discharged from the other end 10'E2 of the tube body 10' through the clearance formed between the inner peripheral surface 10'a of the tube body 10' and the flat surface 70D, and the through-hole 42a in the adjustment screw 42.

Furthermore, in the case where the force applied to the needle member 70 by the pressure of the refrigerant exceeds the biasing force of the coil spring 16, the refrigerant that flows through the above-mentioned throttle portion presses the needle member 70 in a direction to move the needle member 70 further away from the periphery of the valve port 48P. At that time, sliding resistance is generated as a consequence of the fact that a working pressure of the refrigerant present between the inner peripheral surface 10'a of the tube body 10' and the flat surface 70D of the needle member 70, which acts in the radial direction of the body portion 70B and presses part of the outer peripheral surface of the body portion 70B located opposite from the flat surface 70D against the inner peripheral surface 10'a of the tube body 10'. Hence, the flow rate of the refrigerant is changed with the so-called hysteresis, and occurrence of hunting is thus suppressed.

The invention claimed is:

1. A throttle device comprising:
    a tube body provided in a duct to supply a refrigerant, and including open end portions located at two ends to communicate with insides of the duct;
    a valve seat provided in the tube body, and having a valve port;
    a needle member provided to be capable of coming close to and moving away from the valve port of the valve seat, and having a tapered portion to control an opening area of the valve port;
    a biasing member provided between the needle member and one of the open end portions of the tube body, and configured to bias the needle member in a direction to come close to the valve port of the valve seat; and
    braking means that includes a clearance formed adjacent the needle member for inducing a pressure of the refrigerant such that an outer peripheral surface of a body portion of the needle member is pressed against an inner peripheral surface of the tube body in a radial direction from a central axis of the needle member when the refrigerant passes through the valve port, wherein the induced pressure is attributable to the clearance.

2. The throttle device according to claim 1, further comprising
    a stopper member provided between the needle member and the other open end portion of the tube body and configured, in a case where a force applied to the needle member by the pressure of the refrigerant does not exceed a biasing force of the biasing member, to be in contact with and support a front end portion of the tapered portion of the needle member biased by the basing member such that a clearance is formed between the tapered portion of the needle member and a periphery of the valve port.

3. The throttle device according to claim 1, wherein the clearance is formed by a flat surface formed at a position away from the center axis in the body portion of the needle member, and an inner peripheral surface of the tube body opposed to the flat surface.

4. A throttle device comprising:
    a guide tube provided in a duct to supply a refrigerant, and having open end portions located at two ends to communicate with insides of the duct;
    a valve seat formed in the guide tube, and having a valve port;
    at least one communication path formed in a portion of the guide tube adjacent to the valve seat, and configured to establish communication between an inner peripheral part and an outer peripheral part of the guide tube;
    a needle member provided to be capable of coming close to and moving away from the valve port of the valve seat, and having a tapered portion to control an opening area of the valve port;
    a biasing member provided between the needle member and one of the open end portions of the guide tube, and configured to bias the needle member in a direction to come close to the valve port of the valve seat; and
    braking means that includes one of a clearance, a groove, or a slant surface portion formed adjacent the needle member for inducing a pressure of the refrigerant such that an outer peripheral surface of a body portion of the needle member is pressed against an inner peripheral surface of the guide tube in a radial direction from a central axis of the needle member when the refrigerant passes through the valve port,
    wherein the induced pressure is attributable to one of the clearance, the groove, or the slant surface portion.

5. The throttle device according to claim 4, further comprising
    a stopper member provided between the needle member and the other open end portion of the guide tube and configured, in a case where a force applied to the needle member by the pressure of the refrigerant does not exceed a biasing force of the biasing member, to be in contact with and support a front end portion of the tapered portion of the needle member biased by the basing member such that a clearance is formed between the tapered portion of the needle member and a periphery of the valve port.

6. The throttle device according to claim 4, wherein the clearance is formed by a flat surface formed at a position away from the center axis in the body portion of the needle member, and an inner peripheral surface of the guide tube opposed to the flat surface.

7. The throttle device according to claim 4, wherein the clearance is formed by the tapered portion of the needle member, and a groove formed in a periphery of the valve port.

8. The throttle device according to claim 4, wherein the clearance is formed by a flat surface formed at the tapered portion of the needle member, and a periphery of the valve port opposed to the flat surface.

9. The throttle device according to claim 4, wherein the braking means comprises a groove penetrating the tapered portion of the needle member along a radial direction of the tapered portion.

10. The throttle device according to claim 4, wherein the slant surface portion is formed at a front end of the needle member.

11. The throttle device according to claim 4, further comprising a biasing member support portion configured to support the biasing member, wherein
when the needle member is moved toward a spring guide portion of the biasing member support portion by a predetermined value or more, a front end of the spring guide portion comes into contact with a front end of the needle member opposed to the front end of the spring guide portion.

12. A refrigeration cycle system comprising:
an evaporator;
a compressor; and
a condenser,
wherein the throttle device according to claim 1 is provided in a duct located between an outlet of the condenser and an inlet of the evaporator.

13. A refrigeration cycle system comprising:
an evaporator;
a compressor; and
a condenser,
wherein the throttle device according to claim 4 is provided in a duct located between an outlet of the condenser and an inlet of the evaporator.

\* \* \* \* \*